US009418146B2

(12) United States Patent
Deshpande et al.

(10) Patent No.: US 9,418,146 B2
(45) Date of Patent: *Aug. 16, 2016

(54) OPTIMIZING A CLUSTERED VIRTUAL COMPUTING ENVIRONMENT

(71) Applicant: International Business Machines Corporation, Armonk, NY (US)

(72) Inventors: Deepak A. Deshpande, Pune (IN); Bhooshan P. Kelkar, Pune (IN)

(73) Assignee: International Business Machines Corporation, Armonk, NY (US)

(*) Notice: Subject to any disclaimer, the term of this patent is extended or adjusted under 35 U.S.C. 154(b) by 133 days.

This patent is subject to a terminal disclaimer.

(21) Appl. No.: 14/478,163

(22) Filed: Sep. 5, 2014

(65) Prior Publication Data

US 2014/0380174 A1  Dec. 25, 2014

Related U.S. Application Data

(63) Continuation of application No. 13/849,596, filed on Mar. 25, 2013, now Pat. No. 9,002,893.

(51) Int. Cl.
*G06F 17/30* (2006.01)
*G06F 3/0484* (2013.01)
*H04L 12/24* (2006.01)

(52) U.S. Cl.
CPC ...... *G06F 17/30705* (2013.01); *G06F 3/04847* (2013.01); *G06F 17/30557* (2013.01); *H04L 41/14* (2013.01)

(58) Field of Classification Search
CPC .......................... G06F 17/30; G06F 17/30705

USPC .................................................. 707/600–899
See application file for complete search history.

(56) References Cited

U.S. PATENT DOCUMENTS

| 8,856,936 | B2 | 10/2014 | Ray et al. |
| 9,002,893 | B2* | 4/2015 | Deshpande ......... G06F 3/04847 707/791 |
| 2009/0106756 | A1 | 4/2009 | Feng et al. |
| 2010/0299675 | A1 | 11/2010 | Yuyitung et al. |
| 2011/0191461 | A1 | 8/2011 | Dasgupta et al. |
| 2011/0302578 | A1 | 12/2011 | Isci et al. |
| 2012/0116743 | A1 | 5/2012 | Ayala et al. |
| 2012/0159367 | A1 | 6/2012 | Calcaterra et al. |

OTHER PUBLICATIONS

Agrawal et al., "Fast Similarity Search in the Presence of Noise, Scaling, and Translation in Time-Series Databases," Proceedings of the 21st VLDB conference, Zurich, Switzerland 1995.

(Continued)

*Primary Examiner* — Isaac M Woo
(74) *Attorney, Agent, or Firm* — Alexander G. Jochym

(57) ABSTRACT

Exemplary embodiments of the present invention disclose a method, computer program product, and system for optimizing a clustered virtual computing environment. In exemplary embodiments, performance attributes are identified for a set of operating devices within the clustered virtual computing environment. Historical data of the identified performance attributes is obtained to create a historical data repository. A rulebase is developed using the historical data repository and input from user. A combined correlation pattern repository is generated using a first correlation pattern, a second correlation pattern and a scale-time invariant weight fraction.

6 Claims, 6 Drawing Sheets

(56) References Cited

OTHER PUBLICATIONS

Chu et al., "Fast Time-Series Searching with Scaling and Shifting," PODS '99: Proceedings of the eighteenth ACM SIGMOD-SIGACT-SIGART symposium on Principles of database systems, May 1999, Copyright ACM 1999, pp. 237-248, Philadelphia, PA.

Elnaggar, "Towards Energy Efficient Workload Placement in Data Centers," Document provided by evaluator Apr. 21, 2012.

Ganapathi et al., "Statistics-Driven Workload Modeling for the Cloud," 2010 IEEE 26th International Conference on Data Engineering Workshops (ICDEW), pp. 87-92, Mar. 1-6, 2010. doi: 10.1109/ICDEW.2010.5452742.

Gmach et al., "Capacity Management and Demand Prediction for Next Generation Data Centers," ICWS 2007. IEEE International Conference on Web Services, 2007, pp. 43-50, Jul. 9-13, 2007 doi: 10.1109/ICWS.2007.62.

Kang et al., "DAPA: Diagnosing Application Performance Anomalies for Virtualized Infrastructures." Document provided by evaluator Apr. 21, 2012.

Khan et al., "Workload Characterization and Prediction in the Cloud: A Multiple Time Series Approach." Document provided by evaluator Apr. 21, 2012.

Sharma et al., "Modeling and Synthesizing Task Placement Constraints in Google Compute Clusters," SOCC '11, Oct. 27-28, Cascais, Portugal.

"NEC Invariant Analyzer with Oracle Enterprise Manager," White Paper, Copyright 2012 NEC Corporation.

Chung et al., "Advances in Grid and Pervasive Computing", (Hardcopy Book),First International Conference, GPC 2006 Taichung, Taiwan, May 2006 Proceedings, Copyright Springer-Verlag Berlin Heidelberg 2006, LNCS 3947, Library of Congress Control No. 2006924367.

\* cited by examiner

OPTIMIZING A CLUSTERED VIRTUAL COMPUTING ENVIRONMENT

FIELD OF THE INVENTION

The present invention relates generally to the field of clustered virtual computing environments and more particularly to optimizing a clustered virtual computing environment.

BACKGROUND OF THE INVENTION

Various attributes, also know as resources of a clustered virtual computing environment infrastructure such as physical resources (memory, CPU, N/W/I/O, etc.) and non-physical resource (e.g. license costs, legal requirements, and infrastructure attributes) may be correlated by a function or set of functions. Many times, the correlation by the function or set of functions is temporal in nature. Many times, it is useful to understand the correlation by the function or set of functions. In one instance, a use of the correlation by the function or set of functions would be in optimal allocation of resources within the clustered virtual computing environment. Historically, it has been seen that some basic methods of modeling have been deployed, that use historical data to make predictions, and the historical methods are based on machine learning and/or simple statistics.

SUMMARY

One embodiment of the present invention discloses a method, computer program product, and system for optimizing a clustered virtual computing environment. In exemplary embodiments, performance attributes are identified for a set of operating devices within the clustered virtual computing environment. Historical data of the identified performance attributes is obtained to create a historical data repository. A first correlation pattern between the overall demand on the performance attributes on the clustered virtual computing environment and the aggregate availability of the performance attributes of the operating devices in the set of operating devices is generated using a pre-determined statistical analysis model. A rulebase is developed using the historical data repository and input from user. In exemplary embodiments, the rulebase includes a scale-time invariant weight fraction assigned for scale-time invariant analysis method and at least one of a time window interval for data extraction and length for an acceptable time gap. A pre-processed data repository is derived using the rulebase and the historical data repository. A second correlation pattern between the overall demand on the performance attributes on the clustered virtual computing environment and the aggregate availability of the performance attributes of the operating devices in the set of operating device is generated using a pre-determined scale-time invariant analysis method on the pre-processed data repository. A combined correlation pattern repository is generated using the first correlation pattern, the second correlation pattern and the scale-time invariant weight fraction.

DETAILED DESCRIPTION

Figure 1:
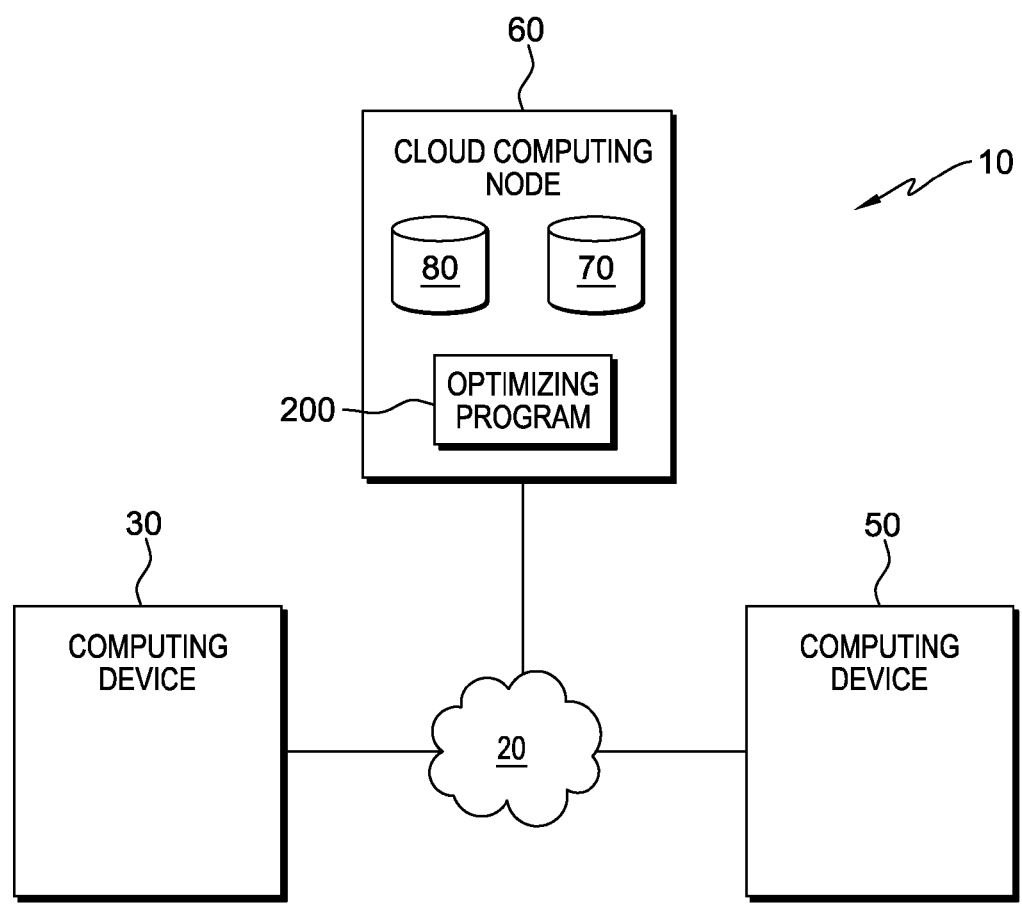
FIG. 1 depicts a diagram illustrating a computing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 depicts a diagram of computing environment 10 in accordance with one embodiment of the present invention. FIG. 1 provides only an illustration of one embodiment and does not imply any limitations with regard to the environments in which different embodiments may be implemented. In another embodiment, computing environment 10 is a cloud computing environment as described in reference to FIGS. 5 and 6.

In the depicted embodiment, computing environment 10 includes computing device 30, computing device 50, and cloud computing node 60, interconnected over network 20. Network 20 is a wide area network (WAN) such as the Internet. In other embodiments, network 20 may be a local area network (LAN), or any combination of connections and protocols that will support communications between computing device 30, computing device 50, and cloud computing node 60 in accordance with embodiments of the invention. Network 20 may include wired, wireless, or fiber optic connections. Computing environment 10 may include additional computing devices, servers, or other devices not shown.

Computing device 30 is a server computer. In other embodiments, computing device 30 may be a laptop computer, desktop computer, tablet computer, smart phone or personal digital assistant (PDA). In general, computing device 30 may be any electronic device or computing system capable of sending and receiving data, and communicating with computing device 50, and cloud computing node 60 over network 20.

Computing device 50 is a server computer. In other embodiments, computing device 50 may be a laptop computer, desktop computer, tablet computer, smart phone or personal digital assistant (PDA). In general, computing device 50 may be any electronic device or computing system capable of sending and receiving data, and communicating with computing device 30 and cloud computing node 60 over network 20.

Cloud computing node 60 is a server computer. In other embodiments, cloud computing node 60 may be a management server, a web server, or any other electronic device capable of receiving and sending data. In another embodiment, cloud computing node 60 may represent a server computing system utilizing multiple computers as a server system, such as in a cloud computing environment. Cloud computing node 60 may be practiced in distributed cloud computing environments where tasks are performed by remote processing devices linked through a communications network. In a distributed cloud computing environment, programs may be located in both local and remote computer system storage devices including memory storage devices. Cloud computing node 60 contains optimizing program 200 for optimizing a clustered virtual computing environment.

Exemplary embodiments of cloud computing node 60 include storage device 70 and storage device 80. Exemplary embodiments of storage device 70 include historical data repository, rulebase, pre-processed data to be used for scale-time invariant method, and combined correlation pattern data repository. Exemplary embodiments of storage device 80 includes data relating to anticipated usage of resources, resource parameters, utilization and non-utilization of cloud infrastructure data, deployment parameters, pre-determined cost function parameters, and pre-determined ranking parameters. Storage device 70 and storage device 80 may be any type of storage device capable of storing data that is accessible by optimizing program 200. Although two storage devices are depicted in this example, any number of separate storage devices may be used.

Figure 4:
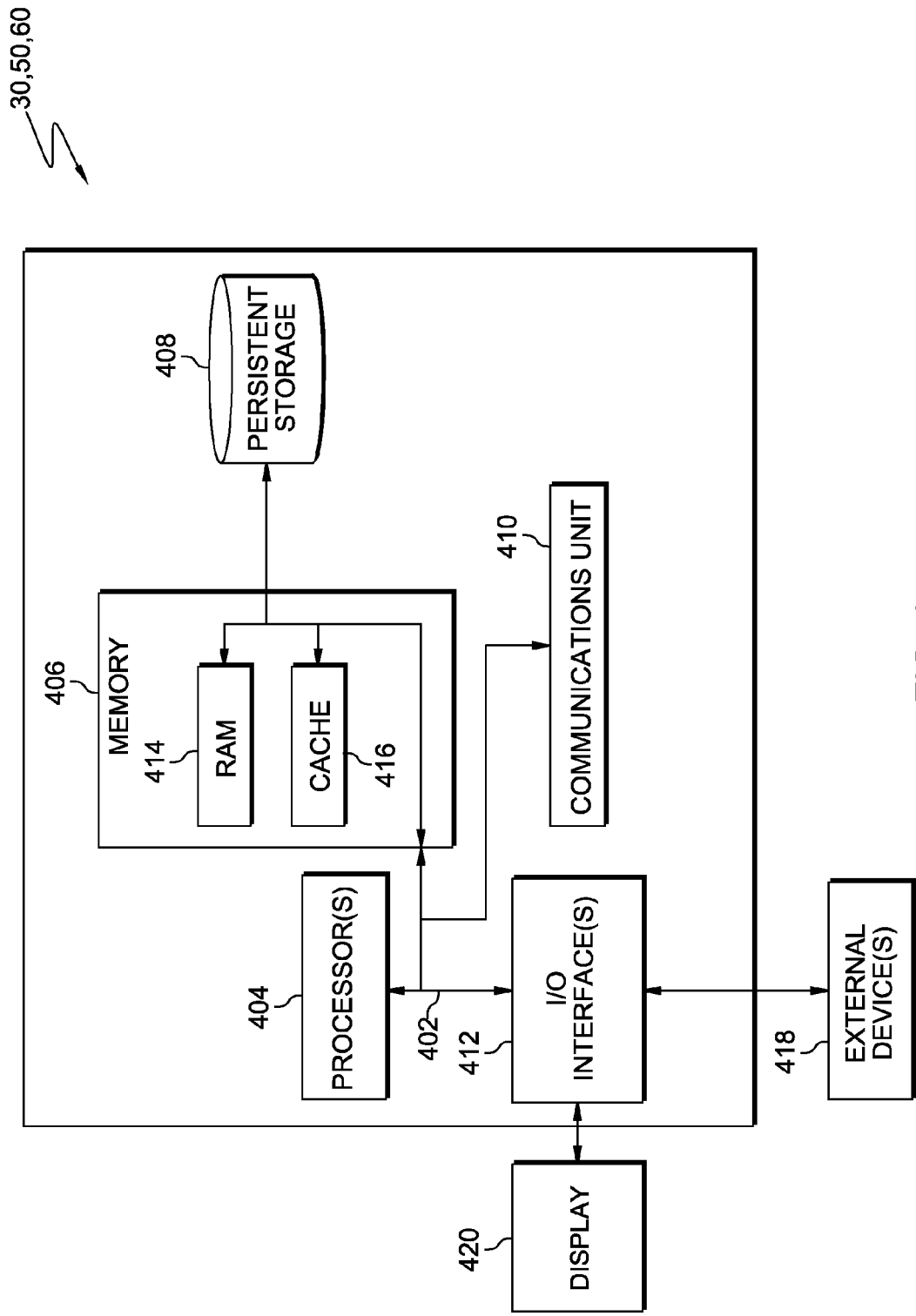
FIG. 4 depicts a cloud computing node according to an embodiment of the present invention.

Computing device 30, computing device 50, and cloud computing node 60 may each include components as depicted in further detail with respect to FIG. 4.

Figure 2:
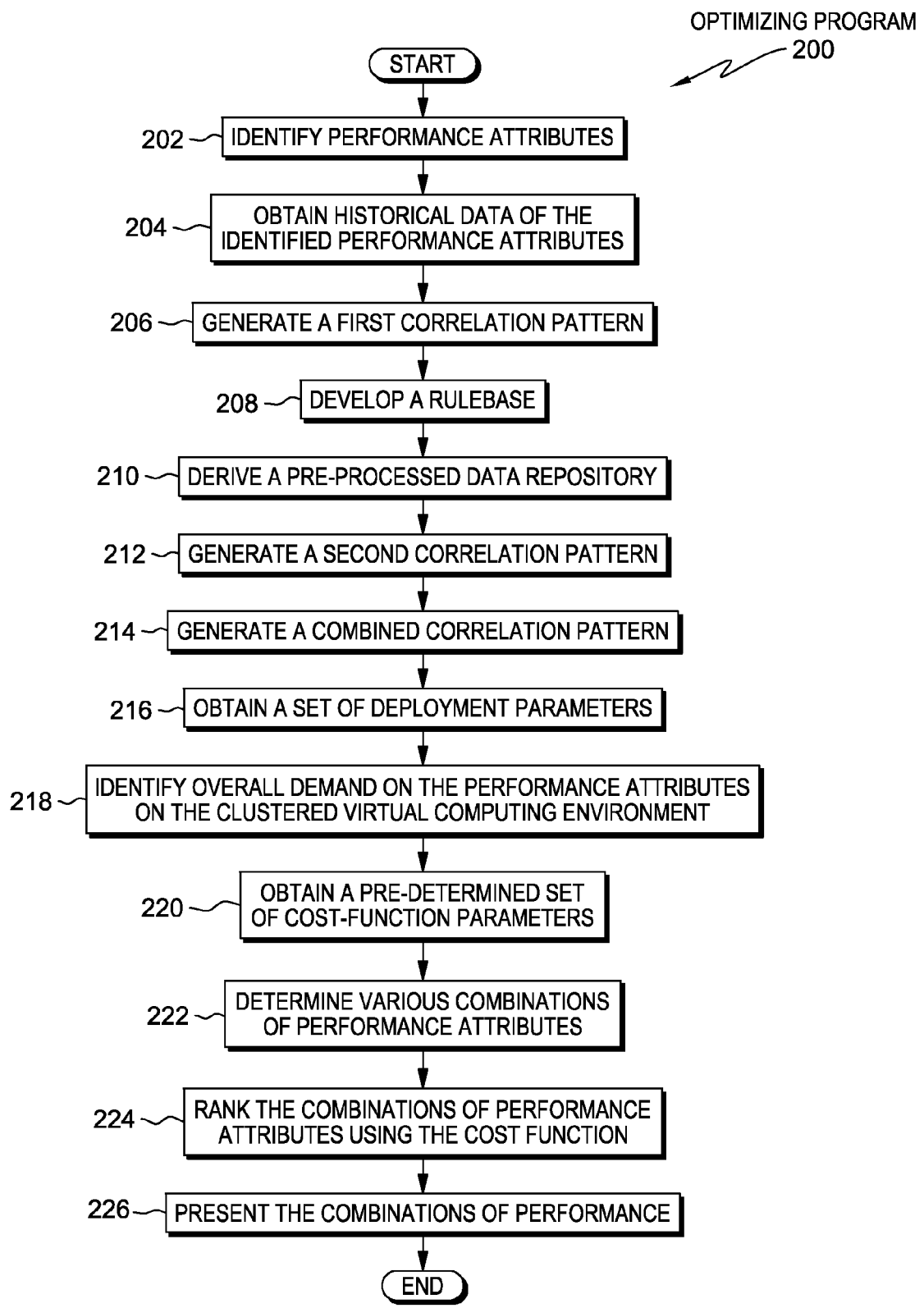
FIG. 2 is a flowchart depicting operational steps of optimizing program within the data processing environment of FIG. 1, in accordance with an embodiment of the present invention.

FIG. 2 is a flowchart depicting operational steps of optimizing program 200 for optimizing a clustered virtual computing environment, in accordance with an embodiment of the present invention. In step 202, optimizing program 200 identifies performance attributes for a set of operating devices within the clustered computing environment. In exemplary embodiments, the performance attributes may include physical attributes and non-physical attributes. In some examples, the physical attributes include a memory, a Central Processing Unit (CPU), Network parameters and Input-output parameters. In some examples, the non-physical attributes include license cost, quantified legal requirements, infrastructure attributes. In some examples, the set of operating devices is a set of virtual machines (VMs).

In step 204, optimizing program 200 obtains historical data of the identified performance attributes to create a historical data repository. In an example, the historical data repository is structured data. In some examples, the historical data includes, but is not limited to: resource allocation, utilization, non-utilization, and other process data, such as, applications used, cost, energy consumption, etc. In step 206, optimizing program 200 generates a first correlation pattern between the overall demand on the performance attributes in the clustered virtual computing environment and the aggregate availability of the performance attributes of the operating devices in the set of operating devices, using a pre-determined statistical analysis model. In an example, optimizing program 200 derives the first correlation pattern using statistics and machine learning methods.

In step 208, optimizing program 200 develops a rulebase using the historical data repository and input from user, wherein the rulebase includes a scale-time invariant weight fraction assigned for scale-time invariant analysis method and at least one of a time window interval for data extraction and length for an acceptable time gap. In exemplary embodiments, the rulebase is stored on storage device 70. Examples of the rulebase may include rules related to, but not limited to: how to validate gaps in data, what should be the size of the window for extraction of data, and deciding method weights for results from multiple methods for combined analysis. In step 210, optimizing program 200 derives a pre-processed data repository using the rulebase and the historical data repository. In an example, the pre-processed data repository is structured data stored in storage device 70. In exemplary embodiments, optimizing program 200 generates the pre-processed data from the data repository using the rulebase to render the extracted data in a manner that is useful for use with scale-time invariant methods.

In step 212, optimizing program 200 generates a second correlation pattern between the overall demand on the performance attributes in? the clustered virtual computing environment and the aggregate availability of the performance attributes of the operating devices in the set of operating devices using a pre-determined scale-time invariant analysis method on the pre-processed data repository.

In step 214, optimizing program 200 generates a combined correlation pattern repository using the first correlation pattern, the second correlation pattern and the scale-time invariant weight fraction. In an example, the combined correlation pattern repository is structured data stored in storage device 70. In exemplary embodiments, optimizing program 200 processes the first correlation pattern data, the second correlation pattern data, and the method weights from the rulebase for multiple methods used, to generate the combined correlation pattern data repository. Optimizing program 200 may utilize clustering or any other appropriate method for creating pattern clusters for faster searching capability.

Once the combined correlation data repository is created, the combined correlation data repository may be used for optimizing cloud computing environment resources. In step 216, optimizing program 200 obtains a set of deployment parameters, wherein the set of deployment parameters includes a time horizon (T). In some exemplary embodiments, optimizing program 200 may identify a resources requirement profile for the setup of the cloud computing environment, based on the utilization and non-utilization data for the setup of the cloud computing environment, and anticipated usage of various applications.

In step 218, optimizing program 200 identifies overall demand on the performance attributes on the clustered virtual computing environment, for the time horizon, based on anticipated usage of various applications using the clustered virtual computing environment. In exemplary embodiments, optimizing program 200 identifies various deployment parameters that may be stored in storage device 80, such as, but not limited to: time horizon (T), etc., using heuristics or predetermined sets of rules, analysis of latest streaming data (live utilization), and anticipated usage of various applications.

In step 220, optimizing program 200 obtains a pre-determined set of cost-function parameters. In an example, optimizing program 200 obtains the pre-determined set of cost-function parameters from storage device 80.

In step 222, optimizing program determines various combinations of performance attributes using the combined correlations pattern repository and calculating a cost function using the pre-determined set of cost function parameters, such that the combinations simultaneously satisfy feasibility constraints, using an algorithm, such as:

for every point in time $t1$, $0 < t1 < T$ $$\text{Sum } (Di\ Pj(t1)) >= \max Pj(t1) \text{ for every } Pj \quad \text{Equation 1}$$

where $Di$ is computing device and $0 < i <= I$, $I$ is the max number of computing devices, $Pj$ is a performance attribute and $0 < j <= J$; $J$ is maximum number of performance attributes considered; and $T$ is the time horizon for which anticipated usage of various applications is being calculated. In exemplary embodiments, optimizing program 200 performs the optimization of various feasible and valid allocations using the predetermined cost function parameters, where cost is calculated for each feasible and valid allocation. In exemplary embodiments, optimizing program 200 may use genetic algorithms, simulated annealing, threshold accepting, or any other pre-determined method for multi-modal cost functions.

In step 224, optimizing program 200 ranks the combinations of performance attributes using the cost function. In an example, optimizing program 200 ranks the combinations of performance attributes based on a set of pre-determined ranking parameters stored in storage device 80.

In step 226, optimizing program 200 presents the combinations of performance attributes to the user. In an example, optimizing program 200 presents various feasible and valid allocations of resources as a ranked list based on the set of pre-determined ranking parameters, to the user in a format able to be viewed by the user, so that the user may make a final selection.

Figure 3:
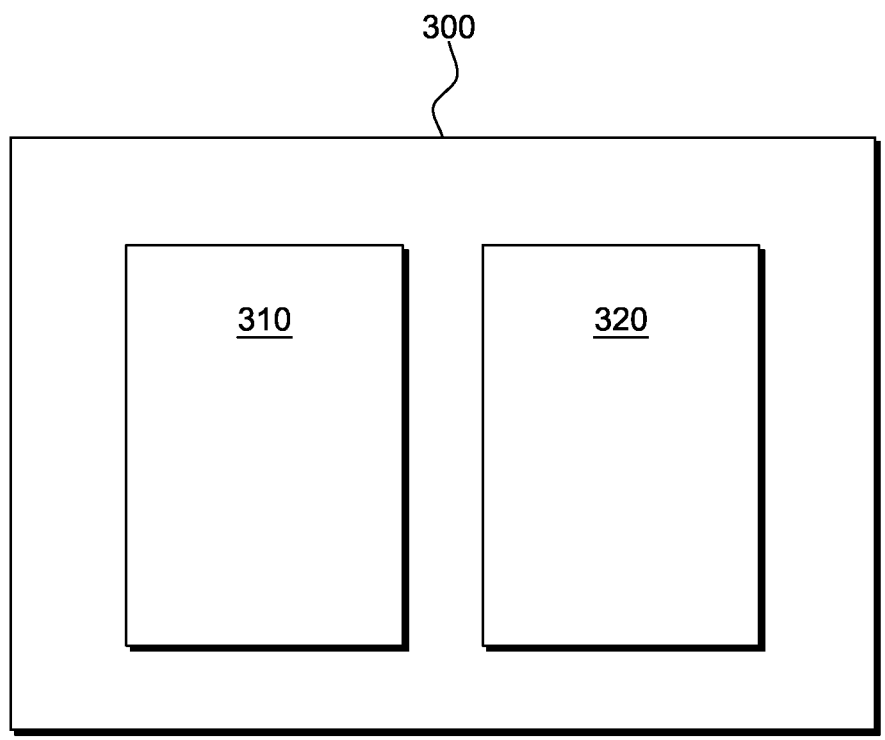
FIG. 3 is a depiction of an environment in which an exemplary embodiment of optimizing program functions, in accordance with an embodiment of the present invention.

FIG. 3 is a depiction of an environment in which an exemplary embodiment of optimizing program functions, in accordance with an embodiment of the present invention. In this very simple example, there are two computing devices, computing device 310 and computing device 320 in a cloud environment 300. In this example, only two performance attributes of computing device 310 and computing device 320 are being evaluated, memory and infrastructure cost. The memory and infrastructure cost are internally correlated and are interdependent. In this example, there is data available for the memory (M1) and infrastructure cost (IC1) of computing device 310, along with data available for the memory (M2) and infrastructure cost (IC2) of computing device 320. Additionally, there is data available for the memory required (Mreq) and infrastructure cost total as a function of time. In this example, there may be some noisy data and some M1 values are reported as zero, or are fluctuating a lot in some historical data. Additionally, patterns are determined in the data, and there is a conclusion using statistics that M1 and M2 move in unison, while IC1 and IC2 are generally inversely proportional. In this example, M1+M2>Mreq for all times. In some cases where data is noisy, statistics may create compromised results, and in fact may have an impact on many other patterns. However, the statistics are still used to arrive at a first correlation between M1, M2 and IC1, IC2.

Now, based on a predetermined time window, optimizing program 200 extracts pieces of data sets and use a gap parameter to filter out data. The predetermined time window can be a decision based on an expert system or a human decision, such as that of a system administrator. The filtering of the data using the gap parameter makes the data cleaner. Optimizing program 200 utilizes a scale-time invariant method to analyze and create patterns between M1, M2, IC1 and IC2, to conclude that the patterns are similar. However, since the noisy data has been dealt with and filled out and/or substituted the gaps, the results in the patterns are improved. In this example, using more weightage given to the scale-time invariant method, say 0.8, the patterns may be combined as follows: pattern M1, M2, IC1=0.2 (statistical pattern)+0.8 (scale-time invariant pattern. The results are stored in a combined correlation pattern repository, which may be found in storage device 70, and the combined correlation pattern repository is populated similarly.

In this example, optimizing program 200 obtains a set of deployment parameters from storage device 80. In this example, the set of deployment parameters includes a time horizon T. For the selected time T, optimizing program obtains a graph of Mreq=f (T), and for each time from now, t=0 to t=T, optimizing program calculates what combination of M1(t) and M2 (t) will satisfy Mreq (t), and at the same time determines if for all t, M1(t)+M2 (t)>=M req (t). Then for each of this, optimizing program 200 calculates the cost function as [M1(t)+M2(t)−Mreq(t)]+IC1+IC2, as the total cost. Thus, an example of cost function could be:

$$\text{cost}(t) = w1 \, \text{Sqrt} \, [M1(t)+M2(t)-M\,\text{req}(t)]^2 + (w2)[IC1(t)+IC2(t)]$$

Equation 2 where, w1 and w2 are pre-determined set of cost function parameters, decided by the user of the cloud computing environment 300. Equation 2 is only exemplary embodiment and other optimization formulae using other distance metrics are possible. In this example, optimizing program ranks the combinations of performance attributes using this cost function and presents the combinations of performance attributes to the user in increasing order of cost, so that the lowest cost solution is listed first. As an extension, if the optimization cost function is identified as multi-modal, use of methods including Genetic Algorithms can also be made.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 4 depicts a block diagram of components of computing device 30, computing device 50, and cloud computing node 60 in accordance with one embodiment of the present invention. It should be appreciated that FIG. 4 provides only an illustration of one implementation and does not imply any limitations with regard to the environments in which different embodiments may be implemented. Many modifications to the depicted environment may be made.

Computing device 30, computing device 50, and cloud computing node 60 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In one embodiment, memory 406 includes random access memory (RAM) 414 and cache memory 416. In general, memory 406 can include any suitable volatile or non-volatile computer-readable storage media.

Optimizing program is stored in persistent storage 408 of cloud computing node 60 for execution by one or more of the respective computer processors 404 of cloud computing node 60 via one or more memories of memory 406 of cloud computing node 60. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other servers, data processing systems, or devices. In these examples, communications unit 410 includes one or more network interface cards. Communications unit 410 may provide communications through the use of either or both physical and wireless communications links. Optimizing program 200 may be downloaded to persistent storage 408 of cloud computing node 60 through communications unit 410 of cloud computing node 60.

I/O interface(s) 412 allows for input and output of data with other devices that may be connected to computing system 10. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., optimizing program 200 can be stored on such portable computer-readable storage media and can be loaded onto persistent storage 408 of cloud computing node 60 via I/O interface(s) 412 of cloud computing node 60. I/O interface(s) 412 also connect to a display 420.

Display 420 provides a mechanism to display data to a user and may be, for example, a computer monitor or a touch screen.

Figure 5:
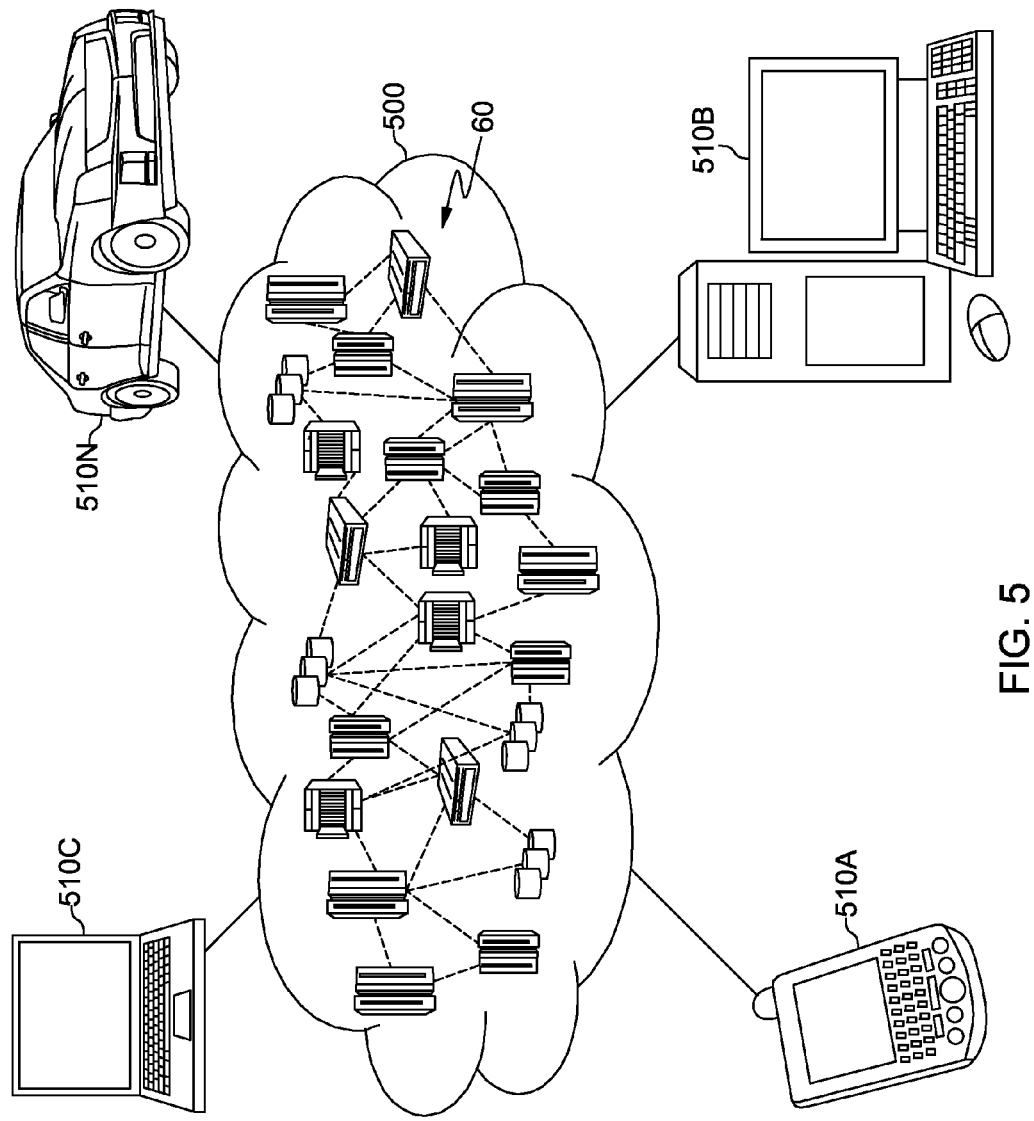
FIG. 5 depicts a cloud computing environment according to an embodiment of the present invention.

FIG. 5 depicts a cloud computing environment according to an embodiment of the present invention. As shown, cloud computing environment 500 comprises one or more cloud computing nodes 60 with which local computing devices used by cloud consumers, such as, for example, personal digital assistant (PDA) or cellular telephone 510A, desktop computer 510B, laptop computer 510C, and/or automobile computer system 510N may communicate. Nodes 60 may communicate with one another. They may be grouped (not shown) physically or virtually, in one or more networks, such as private, community, public, or hybrid clouds as described hereinabove, or a combination thereof. This allows cloud computing environment 500 to offer infrastructure, platforms, and/or software as services for which a cloud consumer does not need to maintain resources on a local computing device. It is understood that the types of computing devices 510A-N shown in FIG. 5 are intended to be illustrative only and that computing nodes 60 and cloud computing environment 500 can communicate with any type of computerized device over any type of network and/or network addressable connection (e.g., using a web browser).

Figure 6:
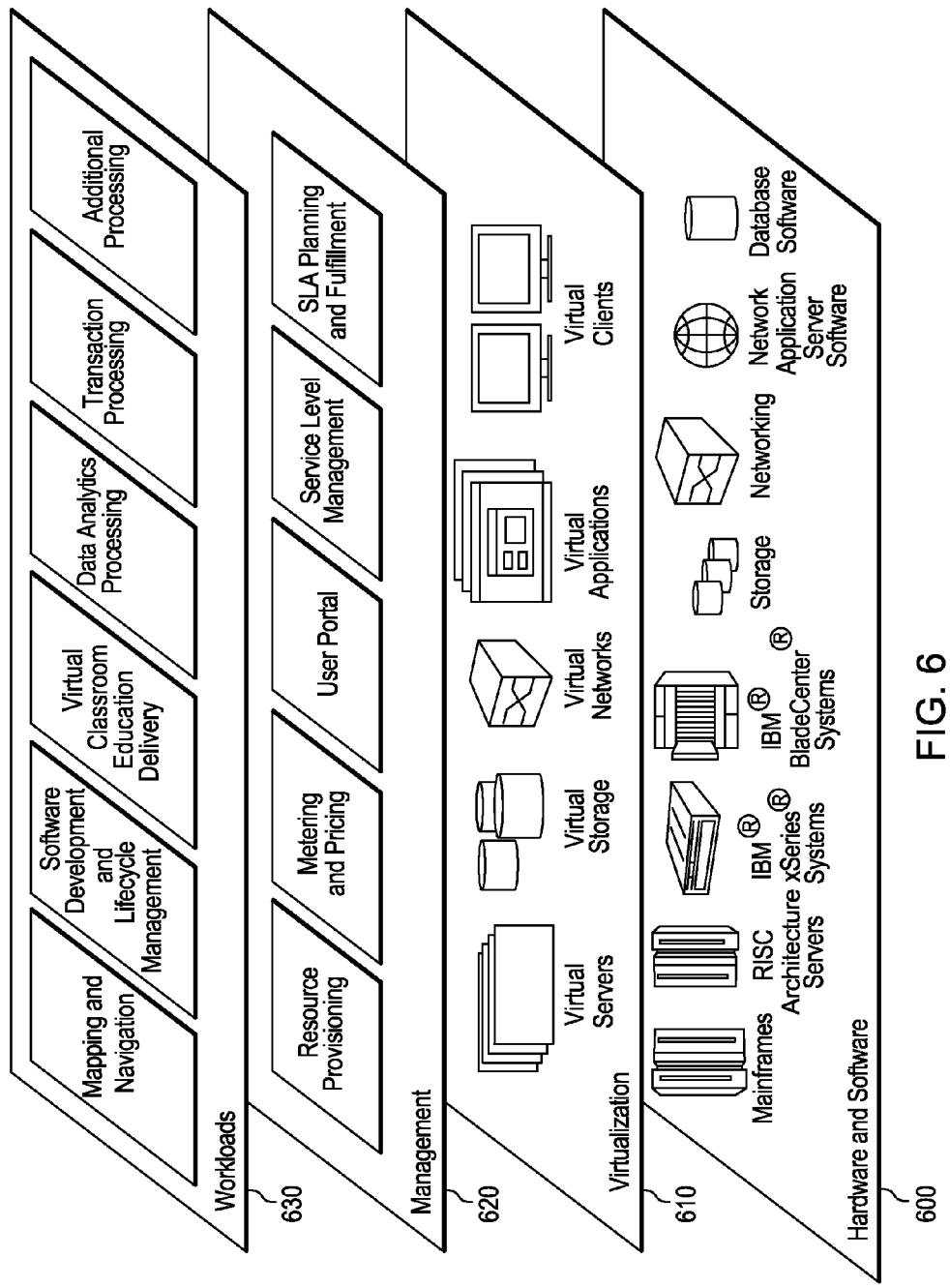
FIG. 6 depicts abstraction model layers according to an embodiment of the present invention.

FIG. 6 depicts a set of functional abstraction layers provided by cloud computing environment 500 (FIG. 5) according to an embodiment of the present invention. It should be understood that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 610 provides an abstraction layer from which the following examples of virtual entities may be provided: virtual servers; virtual storage; virtual networks, including virtual private networks; virtual applications and operating systems; and virtual clients.

In one example, management layer 620 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 630 provides examples of functionality for which the cloud computing environment may be utilized. Examples of workloads and functions which may be provided from this layer include: mapping and navigation; software development and lifecycle management; virtual classroom education delivery; data analytics processing; transaction processing; and additional processing. As mentioned above, all of the foregoing examples described with respect to FIG. 6 are illustrative only, and the invention is not limited to these examples.

It is understood that all functions of the present invention as described herein typically may be performed by the additional processing functionality (of workloads layer 630, which can be tangibly embodied as software and data used to practice embodiments of the present invention, e.g., optimizing program 200 (FIG. 1). However, this need not be the case. Rather, the functionality recited herein could be carried out/implemented and/or enabled by any of the layers 600, 610, 620 or 630 shown in FIG. 6.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for optimizing a clustered computing environment, comprising:
    identifying performance attributes for a set of operating devices within the clustered virtual computing environment;
    obtaining historical data of the identified performance attributes to create a historical data repository;
    generating a first correlation pattern between the overall demand on the performance attributes on the clustered virtual computing environment and the aggregate availability of the performance attributes of the operating devices in the set of operating devices, using a pre-determined statistical analysis model;
    developing a rulebase using the historical data repository and input from user, wherein the rulebase includes a scale-time invariant weight fraction assigned for scale-time invariant analysis method and at least one of a time window interval for data extraction and length for an acceptable time gap;
    deriving a pre-processed data repository using the rulebase and the historical data repository;
    generating a second correlation pattern between the overall demand on the performance attributes on the clustered virtual computing environment and the aggregate availability of the performance attributes of the operating devices in the set of operating devices using a pre-determined scale-time invariant analysis method on the pre-processed data repository; and
    generating a combined correlation pattern repository using the first correlation pattern, the second correlation pattern and the scale-time invariant weight fraction.

2. The method of claim 1, wherein the performance attributes include physical attributes and non-physical attributes.

3. The method of claim 2, wherein the physical attributes include a memory, a central processing unit, network parameters and input-output parameters, and the non-physical attributes include license cost, quantified legal requirements, and infrastructure attributes.

4. The method of claim 1, wherein the set of operating devices is a set of virtual machines.

5. The method of claim 1, wherein the historical data repository, the pre-processed data repository and the combined correlation pattern repository are structured data.

6. The method of claim 1, further comprising:
    obtaining a set of deployment parameters, wherein the set of deployment parameters includes a time horizon T;
    identifying overall demand on the performance attributes on the clustered virtual computing environment, for the time horizon, based on anticipated usage of various applications using the clustered virtual computing environment;
    obtaining a pre-determined set of cost-function parameters;
    determining various combinations of performance attributes using the combined correlations pattern repository and calculating a cost function using the pre-determined set of cost function parameters, such that the combinations simultaneously satisfy feasibility constraints:

for every point in time t1, $0<t1<T$ $\text{Sum}(Di\ Pj(t1)) >= \max Pj(t1)$ for every $Pj$ where Di is computing device and $0<i<=I$, I is the max number of computing devices, Pj is a performance attribute and $0<j<=J$; and J is maximum number of performance attributes considered; and T is the time horizon for which anticipated usage of various applications is being calculated;
    ranking the combinations of performance attributes using the cost function; and
    presenting the combinations of performance attributes to the user.

* * * * *